United States Patent [19]

Cox et al.

[11] 4,324,224
[45] Apr. 13, 1982

[54] TEMPERATURE CONTROL SYSTEM

[76] Inventors: Howard E. Cox, Rte. #2, Box 215c, Hoopeston, Ill. 60942; Dale L. Rush, P.O. Box 4, Wellington, Ill. 60973

[21] Appl. No.: 101,568

[22] Filed: Dec. 10, 1979

[51] Int. Cl.³ ............................................. F24J 3/02
[52] U.S. Cl. ................................. 126/422; 126/429; 126/430
[58] Field of Search ............... 126/422, 419, 429, 431, 126/430

[56] References Cited

U.S. PATENT DOCUMENTS

| | | | |
|---|---|---|---|
| 1,742,861 | 6/1930 | Johnson | 126/270 |
| 2,469,496 | 5/1940 | Christenson | 126/270 |
| 2,680,565 | 6/1965 | Löf | 126/429 |
| 3,897,820 | 8/1975 | Teeter | 126/270 |
| 3,997,108 | 12/1976 | Mason | 126/422 |
| 4,020,989 | 5/1977 | Kautz | 126/270 |
| 4,049,046 | 9/1977 | Worthington | 126/270 |
| 4,068,652 | 1/1978 | Worthington | 126/270 |
| 4,073,284 | 2/1978 | Laing | 126/270 |
| 4,088,115 | 5/1978 | Powell | 126/430 |
| 4,123,883 | 11/1978 | Barber et al. | 126/270 |
| 4,126,270 | 11/1978 | Hummel | 126/270 |
| 4,141,339 | 5/1979 | Weinstein | 126/270 |
| 4,143,815 | 5/1979 | Meysenburg | 126/270 |

Primary Examiner—Samuel Scott
Assistant Examiner—G. Anderson
Attorney, Agent, or Firm—Witherspoon & Hargest

[57] ABSTRACT

A temperature control system for a building wherein a solar collector extends substantially coextensive with at least a portion of at least one vertical wall of the building. The system includes a solar collector and storage unit having means connected thereto for circulating air through such components during a collecting mode at a first predetermined temperature. Air is exhausted from such components during a dumping mode at a second predetermined temperature. Thermostat means are provided to cause air to flow through the storage unit into the building during a heating mode at a third predetermined temperature.

3 Claims, 3 Drawing Figures

U.S. Patent  Apr. 13, 1982  Sheet 1 of 2  4,324,224

TEMPERATURE CONTROL SYSTEM

BACKGROUND OF THE INVENTION

The invention is directed to a temperature control system utilizing solar energy. In such a system there are a number of features which would be desirable if attainable. For example, those systems including solar collectors positioned upon the roof of a building have problems associated with leakage of the roof. Such leakage may result from expansion of collector materials relative to contraction of adjoining roofing materials, especially during the winter months. The elimination of such leakage is desirable.

Another desirable feature is to provide a system which is compatible with existing and new building structures. Prior art devices usually involve cumbersome structures, especially in those instances where they are added to an existing building. Such structures detract from the appearance of a building and involve great expense in the installation thereof. This is especially the case involving units which include solar collectors mounted upon the roof of a building.

Systems which include what might be referred to as lean-to type collectors minimize some of the foregoing problems. However, it is believed that such systems also detract from the appearance of a building. In addition, to the extent that a collector leans against the side of a building or otherwise extends beyond the wall surface thereof, it presents an unnecessary obstruction. This is particularly true regarding those buildings provided with sliding doors. The positioning of the doors vis-a-vis the solar collector must be such that the collector does not prevent opening of the doors. In addition, the use of a lean-to type system requires the construction of an additional foundation and walls.

It is also desirable to provide a system which is readily serviceable. Obviously, roof-type collectors require that the roof be climbed upon to service such a system. This is not only inconvenient but also subjects the collector to possible damage in the event the collector is stepped upon. Further, should the need arise to replace all or part of such a unit, it is necessary to lower the old unit to ground level and to elevate the new unit to the roof of the building.

Further damage to roof top solar collectors may be incurred as a result of various weather conditions. For example, the impact of hail and the weight and melting of snow may have a deleterious affect upon such a structure. In addition, to the extent that a collector is covered by snow its usefulness is diminished.

Temperature control systems which include collectors which are angularly oriented to maximize exposure to the rays of the sun also suffer from what might be referred to as over exposure; that is, exposure on the part of the collector to too much sun. This is especially true during the summer months when it may not be desirable to subject the collector to the excessive build-up of heat normally incurred in roof top collectors or other angularly oriented collector units.

Prior attempts of which we are aware to design vertically oriented collectors have included complicated piping systems for first changing the temperature of water which is subsequently used in a heat exchanger to change the temperature of air.

Accordingly, it is an object of this invention to provide a temperature control system which includes a solar collector which is not mounted upon the roof of a building.

Another object of this invention is to provide a temperature control system which is compatible with existing and new building structures.

Still another object of this invention is to provide a temperature control system which includes a solar collector which does not lean against the side of a building or otherwise extend beyond the wall surface thereof to present an unnecessary obstruction.

A further object of this invention is to provide a temperature control system which includes a solar collector extending in the same plane as the vertical wall of a building so as not to interfere with building components such as sliding doors.

Still a further object of this invention is to provide a temperature control system which does not require the installation of additional foundation or walls.

Yet another object of this invention is to provide a temperature control system which is readily serviceable.

Another object of this invention is to provide a temperature control system having a solar collector which has a minimum exposure to elements of the weather such as snow and hail.

Still another object of this invention is to provide a temperature control system having a solar collector which is not over exposed to the sun.

Yet another object of this invention is to provide a temperature control system which does not include complicated piping arrangements.

Another object of this invention is to provide a temperature control system which does not require the use of a piping system for first changing the temperature of water which is subsequently used in a heat exchanger to change the temperature of air.

SUMMARY OF THE INVENTION

This invention achieves these and other objects by providing a temperature control system for a building comprising a solar collector comprising a heat absorbing panel, a transparent panel spaced from the heat absorbing panel and an air channel therebetween. The panels extend substantially coextensive with at least a portion of at least one vertical wall of the building. A heat storage unit is also provided. Means are connected to the solar collector and the storage unit for recirculating air through the collector and storage unit during a collecting mode at a first predetermined temperature. Means are also provided for exhausting air from the collector and storage unit during a dumping mode at a second predetermined temperature. Thermostat means are provided for causing air flow through the storage unit into the building during a heating mode at a third predetermined temperature.

BRIEF DESCRIPTION OF THE DRAWINGS

This invention may be clearly understood by reference to the attached drawings in which.

DESCRIPTION OF THE PREFERRED EMBODIMENT

Figure 1:
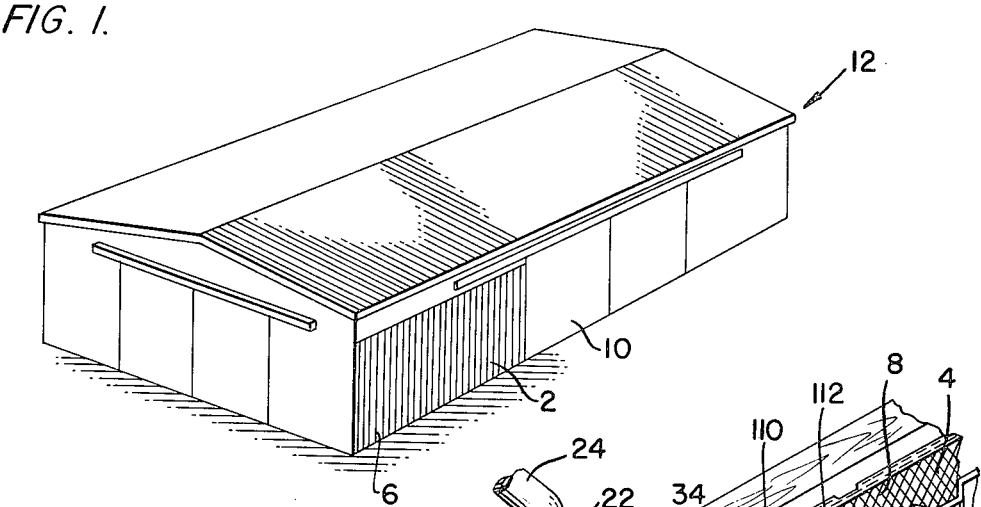
FIG. 1 is a partial view of a building including the solar collector of the present invention.

The embodiment of this invention which is depicted in the drawings is one which is particularly suited for achieving the objects of this invention. The drawings depict a temperature control system for a building comprising a solar collector 2 including a heat absorbing panel 4, a transparent panel 6 spaced from the heat absorbing panel and an air channel 8 therebetween. As depicted in FIG. 1 the solar collector 2 extends substantially coextensive with at least a portion of at least one vertical wall 10 of building 12. The collector is not mounted upon the roof of the building but rather extends along the wall of the building such that the exterior surface 6 is in line with the remaining exterior portions of the wall. Such a structure allows for a continuous collector rather than one having multiple units. This feature is desirable in that there is no need to mount many individual collectors between building studs. Such a structure is therefore particularly useful in post frame-type construction. Such a structure also eliminates the need to orient the collector towards the sun. In addition it has been found that there is no need for such a collector to lean against the side of the building or to otherwise extend beyond the wall surface thereof. Since the collector extends in the same plane as the vertical wall 10, the collector does not present an unnecessary obstruction or otherwise interfere with building components such as sliding doors. In addition, the collector has a minimum exposure to elements of the weather such as snow and hail and is not over exposed to the sun.

Also depicted in the drawings is a heat storage unit 14. Means generally designated 16 are connected to the collector 2 and storage unit 14 for recirculating air through the collector and storage unit during a collecting mode at a first predetermined temperature and for exhausting air from the collector and storage unit during a dumping mode at a second predetermined temperature. Thermostat means 18 are provided within the building for causing air flow through the storage unit into the building during a heating mode at a third predetermined temperature.

The recirculating, exhausting and thermostat means include an air handler which is depicted in the drawings as a fan 20. A first conduit 22 is provided one end 24 of which forms a first vent into the building and the other end 26 of which vents into the storage unit 14. A second conduit 28 is provided one end 30 of which vents into the first conduit 22 and the other end 32 of which vents into one end 34 of the air channel 8. A third conduit 36 is provided one end 38 of which vents into the storage unit 14 and the other end 40 of which vents into the air handler 20. A fourth conduit 42 is provided one end 44 of which vents into the air handler 20 and the other end 46 of which vents into the opposite end 48 of the air channel 8. A fifth conduit 50 is provided one end 52 of which forms a second vent into the building and the other end 54 of which vents into the fourth conduit 42. The first conduit 22 includes an additional vent 56 into the building and is positioned between the second conduit 28 and the storage unit 14.

The recirculating, exhausting and thermostat means also include a first damper 58 in the first conduit 22 and positioned between the first vent 24 and the second conduit 28. A second damper 60 is provided in the second conduit 28. A third damper 62 is provided in the first conduit 22 and is positioned between the second conduit 28 and the storage unit 14. A fourth damper 64 is positioned in the additional vent 56. A fifth damper 66 is positioned in the fifth conduit 50. And a sixth damper 68 is positioned in the fourth conduit 42 between the fifth conduit 50 and the air channel 8.

Means are attached to each of the dampers 58, 60, 62, 64, 66, 68 and the air handler 20 for causing the dampers and air handler to selectively move at predetermined temperatures to open and closed portions during the collecting, heating and dumping modes. When the terms "open" or "opened" are used herein with reference to the air handler, such reference is to energizing the air handler, as for example, turning fan 20 "on" to circulate air. When the terms "close" or "closed" are used herein with reference to the air handler, such reference is to de-energizing the air handler, as for example, turning the fan 20 "off" to stop air circulation.

Figure 2:
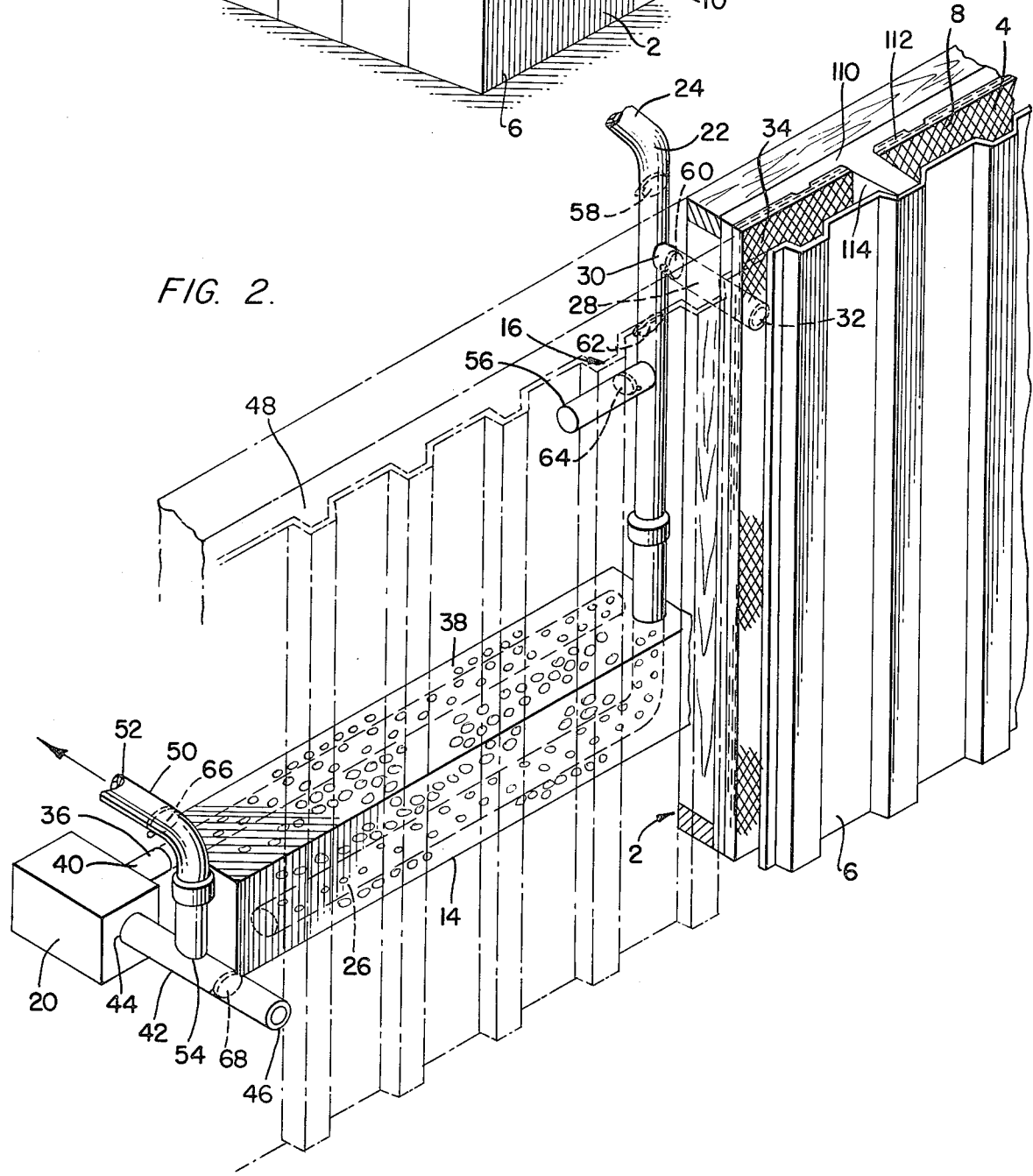
FIG. 2 is a diagrammatic representation of the temperature control system of the present invention.
Figure 3:
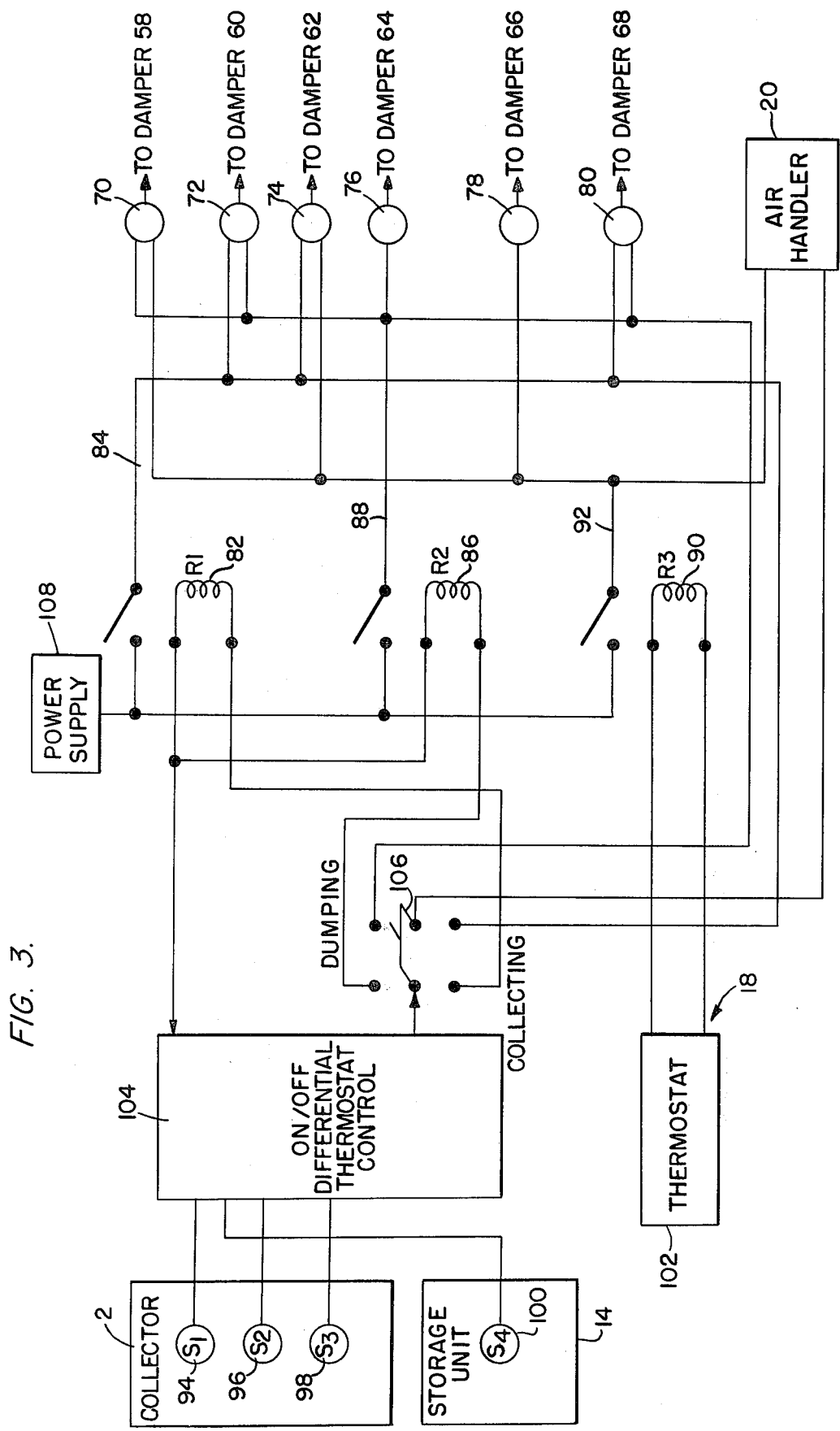
FIG. 3 is a schematic view of the electrical system associated with the present invention.

As depicted in FIG. 3 of the drawings each of the six dampers includes a damper motor numbered 70, 72, 74, 76, 78 and 80, respectively. The combination damper/damper motor is a well known device and will not be described in more detail except to note generally that in the present invention such devices operate by supplying power to the damper motor which causes the damper to pivot and open its associated conduit opening as desired. The opening and closing of select dampers defines the path followed by the air as the air handler 20 causes such air to flow through the various components and conduits described. In the embodiment depicted in the drawings, each damper is spring biased to automatically close its associated conduit when power is no longer applied to its associated damper motor. To pivot a select damper to an open position the appropriate motor is actuated when a corresponding relay is energized to thereby close a circuit between a source of current and the motor. For purposes of illustration FIG. 2 diagramatically depicts the dampers but does not depict the remaining features of the electrical system. For this purpose, reference is made to the schematic diagram of FIG. 3.

In FIG. 3, the second damper motor 72, third damper motor 74, and sixth damper motor 80 are electrically coupled by wire 84 to a first relay 82 which includes a switch and coil. The first damper motor 70, second damper motor 72, fourth damper motor 76 and sixth damper motor 80 are electrically coupled by wire 88 to a second relay 86 which includes a switch and coil. The first damper motor 70, third damper motor 74 and fifth damper motor 78 are electrically coupled by wire 92 to a third relay 90 which includes a switch and coil. At least one of the relays is electrically coupled to the air handler in the collecting, heating and dumping modes as described in more detail below:

Each of the relays is electrically coupled to means for energizing the relays at predetermined temperatures to cause the dampers and air handler to selectively move to opened and closed positions during collecting, heating and dumping modes. For example, as depicted in FIG. 3 the collector 2 has positioned therein a first temperature sensor 94, a second temperature sensor 96 and a third temperature sensor 98. The storage unit 14 has positioned therein a fourth temperature sensor 100. The building has positioned therein a thermostat 102. The first and fourth sensors are electrically coupled to the first relay 82 through a thermostat control means 104 for energizing the first relay 82 at predetermined temperatures to cause the second damper 60, third damper 62, sixth damper 68 and the air handler 20 to move to opened positions during the collecting mode.

The second sensor 96 and third sensor 98 are electrically coupled to the second relay 86 through the thermostat control means 104 for energizing the second relay 86 at predetermined temperatures to cause the first damper 58, second damper 60, fourth damper 64, sixth damper 68 and the air handler 20 to move to opened positions during the dumping mode.

The thermostat 102 is electrically coupled to the third relay 90 for energizing the third relay at predetermined temperatures to cause the first damper 58, third damper 62, fifth damper 66 and air handler 20 to move to opened positions during the heating mode.

In the preferred embodiment, the thermostat control means 104 is an on/off differential thermostat control device of the type which may be adjusted so that the predetermined temperature for energizing the first relay 82 occurs when the temperature of the collector is a predetermined number of degrees greater than the temperature of the storage unit and continues until such difference in temperature is reduced to a predetermined number of degrees. A device which meets these conditions and is used in the preferred embodiment is manufactured by Hawthorne Industries, Inc. of West Palm Beach, Fla. under model number H-1503-B.

As noted, at least one of the relays is electrically coupled to the air handler 20 in the collecting, heating and dumping modes. Referring to FIG. 3 the differential thermostat control 104 is electrically coupled to relays 82 and 86 through a double pole-double throw switch 106. Thermostat 102 is electrically coupled to relay 90. When the switch 106 is in the "off" position, air handler 20 is electrically coupled to relay 90 so as to be actuated when relay 90 is energized in the heating mode at the predetermined temperature setting of thermostat 102. When the switch 106 is in the dumping position, air handler 20 is also electrically coupled to relay 86 so as to also be actuated when relay 86 is energized in the dumping mode at the predetermined temperature setting of sensors 96 or 98. Finally, when the switch 106 is in the collecting position, air handler 20 is electrically coupled to relay 90, as described above, and also to relay 82 so as to also be actuated when relay 82 is energized in the collecting mode at the predetermined temperatures of sensors 94 and 100.

When any of the relays 82, 86 and 90 are energized so as to close their respective switches, current is supplied to the respective damper motors and the air handler by means of a power supply generally designated 108.

In operation, the preferred on/off differential thermostat control 104 is of the type which allows for a turn-on differential of 10° F. and a turn-off differential of 3° F. Sensor 94 senses the temperature of the collector 2 and sensor 100 senses the temperature of the storage unit 14. Appropriate adjustments are made to the on/off differential thermostat control 104 so that in the collecting mode the air handler will be turned on and the appropriate dampers opened by their associated damper motors when the temperature of the collector is 10° F. greater than the temperature of the storage unit. The air handler will be turned off and such dampers caused to close their associated conduits when such temperature difference reaches 3° F. For example, switch 106 is turned to the collecting position so that the collecting mode may be actuated when such predetermined temperatures are reached. At such time, relay 82 is energized closing its associated switch to allow current from power supply 108 to be supplied to the air handler 20. Similarly, current is supplied to damper motors 72, 74 and 80 to open dampers 60, 62 and 68. Accordingly, in the collecting mode the air handler causes heated air in channel 8 of collector 2 to be circulated through conduits 28 and 22 into storage unit 14. In the preferred embodiment the storage unit 14 is a concrete box the walls of which are 2 to 2½ inches thick. In order to maximize the utilization of space in the building such box may be covered with a suitable top for use as a table or for storage. The ends 26, 38 of conduits 22, 36, respectively, extend into the concrete box and are perforated. The box is filled with a heat absorbing material, and in the preferred embodiment such material is pieces of rock. The heated air flowing from channel 8 through conduit 22 enters the storage unit 14 through such perforations. The heat is exchanged from the air to the rocks and the air then enters conduit 36 through its perforated end 38. Such air then passes through the air handler, through conduit 42 and back into channel 8 where it is reheated and recirculated. When the temperature difference between the storage unit and collector reaches 3° F., relay 82 is de-energized, the air handler is turned off and the spring biased dampers 60, 62 and 68 spring to close the conduits with which they are associated. The collecting mode is actuated again only when such temperature difference reaches 10° F. In such a system there is no need to first heat water and subsequently use such water in a heat exchanger to change the temperature of the heating air.

The on-off differential thermostat control 104 is also of the type which allows for turning on the mechanism when an upper temperature limit is reached and for this purpose may be used as a safety feature to actuate the dumping mode when the collector is subjected to excessive temperatures. In the preferred embodiment, sensors 96 and 98 sense the temperature of the collector 2. Appropriate adjustments are made to the on/off differential thermostat control 104 so that in the dumping mode the air handler will be turned on and the appropriate dampers opened by their associated damper motors when the temperature of the collector reaches 180° F. For this purpose sensor 96 is used. Sensor 98 is a backup thermostat which initiates dumping when the temperature of the collector reaches 200° F., should sensor 96 fail. In the embodiment depicted in FIG. 3, switch 106 is turned to the dumping position so that the dumping mode may be actuated when either of such predetermined temperatures are reached. At such time, relay 86 is energized closing it associated switch to allow current from power supply 108 to be supplied to the air handler 20. Similarly, current is supplied to damper motors 70, 72, 76 and 80 to open dampers 58, 60, 64 and 68. Accordingly, in the dumping mode the air handler causes the excessively heated air in channel 8 of collector 2 to be vented. For this purpose the air ventilator draws air from the interior of the building into vent 56 and through pipe 22 from which the air exits into storage unit 14 through the perforations in the conduit end 26. Such air is then drawn through the perforations in the end 38 of pipe 36, passed through the air handler and forced into the channel 8 through conduit 42. The movement of this air forces the excessively heated air in channel 8 to be force vented through conduits 28 and 22 and exited from conduit 22 through end 24 thereof. When the temperature decreases relay 86 is de-energized, the air handler is turned off and the spring biased dampers 58, 60, 64 and 68 spring to close the conduits with which they are associated. The dumping mode is actuated again only when the temperature in the collector exceeds 180° F.

To actuate the heating mode the thermostat is set at the desired temperature. When such predetermined temperature is reached the relay 90 is energized closing its associated switch to allow current from power supply 108 to be supplied to the air handler 20. Similarly, current is supplied to damper motors 70, 74 and 78 to open dampers 58, 62 and 66. Accordingly, in the heating mode the air handler causes the air within the building to be drawn into conduit 22 at the end 24. Preferably, end 24 is positioned near the ceiling or gable portion of the building so that the hot air which usually accumulates there may be recirculated. The air drawn into conduit 22 passes therethrough and enters storage unit 14 through the perforations in the end 26 of conduit 22. The room temperature air picks up heat from the heated rocks within storage unit 14 and is drawn through the perforations in the end 38 and passed through pipe 36 to the air handler 20. From air handler 20 the heated air is blown through conduit 42 to conduit 50 from which the air is distributed directly into the building, or indirectly into the building through appropriate ducts. When the temperature reaches the desired predetermined temperature, relay 90 is de-energized, the air handler is turned off and the spring biased dampers 58, 62 and 66 spring to close the conduits with which they are associated. The heating mode is actuated again only when the temperature in the building reaches the temperature setting of thermostat 102.

The embodiment described herein includes a switch 106 which may be positioned in an off, collecting or dumping position. As a practical matter, switch 106 will usually be switched to the collecting position during the cold months of the year and the dumping position during the warm months of the year. However, the present invention may be altered to allow for collecting and dumping throughout the entire year. This is particularly true if it is desired to use the temperature control system as an energy source in a cooling system during the warm months. Such a system would be possible, for example, by using two on/off differential thermostat control devices 104 each of which would be turned on individually. One such control device would actuate the dumping mode at predetermined temperature and the other would actuate the collecting mode at predetermined temperatures. Other arrangements may also be possible for simultaneously actuating the collecting and dumping modes throughout the year. In those buildings where the temperature control system is also used as an energy source in a cooling system, such system would function by setting the thermostat 102 at the desired temperature. When such temperature is reached relay 90 would be actuated as already described in connection with the heating mode. When cooling, however, the heated air would be circulated from conduit 50 to whatever form of cooling system is being used in the building rather than for use in heating the building.

The collector 8 of the preferred embodiment includes a heat absorbing panel 4 comprising a rigid foil faced urethane insulation 110 and a plurality of layers 112 of black expanded aluminum sandwiched together and having black steel sheets as backing. The panel 4 is spaced from a transparent panel 6 which is preferably made from fiberglass. The two panels are spaced by means of a standoff member 114. Such a structure is compatible with existing and new building structures and does not require the installation of additional foundation or walls. Since collector 8 extends substantially coextensive with at least a portion of at least one vertical wall of the building it is readily serviceable and in many installations may be serviced from ground level using a step ladder. If desired, the collector may be mounted upon the existing surface of a building.

The collector and storage unit of the temperature control system of this invention provide a wall-type system having a minimum number of conduits thereby providing a non-complicated piping arrangement.

Although the storage unit is depicted as a concrete box, the present invention is not limited to such a construction. For example, in new buildings it is contemplated that the storage unit may be built directly beneath a concrete floor. In such a structure additional heat would be obtained in the building through the floor.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A temperature control system for a building comprising
a solar collector comprising a heat absorbing panel, a transparent panel spaced from said heat absorbing panel, and an air channel therebetween, said panels extending substantially coextensive with at least a portion of at least one vertical wall of said building;
a heat storage unit;
a plurality of conduits and an air handler for circulating air through said collector and storage unit during a collecting mode at a first predetermined temperature, for exhausting air from said collector and storage unit during a dumping mode at a second predetermined temperature, and for causing air flow through said storage unit into said building during a heating mode at a third predetermined temperature, said plurality of conduits comprising a first conduit one end of which forms a first vent into said building and the other end of which vents into said storage unit, a second conduit one end of which vents into said first conduit and the other end of which vents into one end of said air channel, a third conduit one end of which vents into said storage unit and the other end of which vents into said air handler, a fourth conduit one end of which vents into said air handler and the other end of which vents into the opposite end of said air channel, and a fifth conduit one end of which forms a second vent into said building and the other end of which vents into said fourth conduit, said first conduit including an additional vent into said building between said second conduit and said storage unit; and,
a plurality of dampers including a first damper in said first conduit and positioned between said first vent and said second conduit, a second damper in said second conduit, a third damper in said first conduit and positioned between said second conduit and said storage unit, a fourth damper in said additional vent, a fifth damper in said fifth conduit, and a sixth damper in said fourth conduit and positioned between said fifth conduit and said air channel, each of said six dampers including a damper motor, said second, third and sixth motors being electrically coupled to a first relay, said first, second, fourth and sixth motors being electrically coupled to a second relay, and said first, third and fifth motors being electrically coupled to a third relay, at least one of said relays being electrically coupled to said air handler in said collecting, heating and dumping modes, and each of said relays being electrically coupled to means for energizing said relays at predetermined temperatures to cause said dampers and said air handler to selectively move to opened and closed positions during said collecting, heating and dumping modes.

2. The temperature control system of claim 1 wherein said collector has positioned therein a first, second and third temperature sensors, said storage unit has positioned therein a fourth temperature sensor, and said building has positioned therein a thermostat, said first and fourth sensors being electrically coupled to said first relay through a thermostat control means for energizing said first relay at predetermined temperatures to cause said second, third and sixth dampers and said air handler to move to opened positions during said collecting mode, said second and third sensors being electrically coupled to said second relay through a thermostat control means for energizing said second relay at predetermined temperatures to cause said first, second, fourth and sixth dampers and said air handler to move to opened positions during said dumping mode, and said thermostat being electrically coupled to said third relay for energizing said third relay at predetermined temperatures to cause said first, third and fifth dampers and said air handler to move to opened positions during said heating mode.

3. The temperature control system of claim 2 wherein said thermostat control means includes an on/off differential thermostat control device and said predetermined temperature for energizing said first relay occurs when the temperature of said collector is 10° F. greater than the temperature of said storage unit and continues until said difference in temperature is reduced to 3° F.

* * * * *